(12) United States Patent
Yasuda et al.

(10) Patent No.: US 12,318,738 B2
(45) Date of Patent: Jun. 3, 2025

(54) COMPOSITE SEMI-PERMEABLE MEMBRANE

(71) Applicant: TORAY INDUSTRIES, INC., Tokyo (JP)

(72) Inventors: Takaaki Yasuda, Shiga (JP); Yohei Adachi, Shiga (JP); Shinya Mitsui, Shiga (JP); Harutoki Shimura, Shiga (JP); Takafumi Ogawa, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 477 days.

(21) Appl. No.: 17/772,608

(22) PCT Filed: Oct. 30, 2020

(86) PCT No.: PCT/JP2020/040809
§ 371 (c)(1),
(2) Date: Apr. 28, 2022

(87) PCT Pub. No.: WO2021/085599
PCT Pub. Date: May 6, 2021

(65) Prior Publication Data
US 2023/0001363 A1 Jan. 5, 2023

(30) Foreign Application Priority Data

Oct. 31, 2019 (JP) .................................. 2019-198702
May 29, 2020 (JP) .................................. 2020-094348

(51) Int. Cl.
*B01D 71/82* (2006.01)
*B01D 69/02* (2006.01)
(Continued)

(52) U.S. Cl.
CPC ............ *B01D 71/82* (2013.01); *B01D 69/02* (2013.01); *B01D 69/107* (2022.08);
(Continued)

(58) Field of Classification Search
CPC .............................. B01D 71/82; B01D 71/56
See application file for complete search history.

(56) References Cited

U.S. PATENT DOCUMENTS 3,993,625 A 11/1976 Kurihara et al.
4,086,215 A * 4/1978 Kurihara .................. C08K 3/10
528/331

(Continued)

FOREIGN PATENT DOCUMENTS

CA 2022612 A1 * 6/1991
CN 101417214 A 4/2009
(Continued)

OTHER PUBLICATIONS

Extended European Search Report for European Application No. 20883453.1, dated Oct. 16, 2023.
(Continued)

*Primary Examiner* — Clare M Perrin
(74) *Attorney, Agent, or Firm* — Birch, Stewart, Kolasch & Birch, LLP

(57) ABSTRACT

The present invention relates to a composite semipermeable membrane including: a support membrane including a base and a porous support layer; and a separation functional layer disposed on the porous support layer and including a cross-linked aromatic polyamide, in which the separation functional layer contains sulfo groups in an amount of $7.0 \times 10^{-5}$ to $5.0 \times 10^{-2}$ $g/m^2$ and includes a structure represented by the formula 1.

6 Claims, 1 Drawing Sheet

(51) Int. Cl.
  *B01D 69/10*   (2006.01)
  *B01D 69/12*   (2006.01)
  *B01D 71/56*   (2006.01)

(52) U.S. Cl.
  CPC ..... *B01D 69/1213* (2022.08); *B01D 69/1251* (2022.08); *B01D 71/56* (2013.01); *B01D 2323/36* (2013.01); *B01D 2325/04* (2013.01); *B01D 2325/06* (2013.01); *B01D 2325/26* (2013.01); *B01D 2325/36* (2013.01)

(56) References Cited

U.S. PATENT DOCUMENTS

| | | | |
|---|---|---|---|
| 4,761,234 | A | 8/1988 | Uemura et al. |
| 4,960,517 | A | 10/1990 | Cadotte |
| 4,960,518 | A | 10/1990 | Cadotte et al. |
| 4,964,998 | A | 10/1990 | Cadotte et al. |
| 2009/0107922 | A1 | 4/2009 | Zhang et al. |
| 2012/0152839 | A1 | 6/2012 | Olson et al. |
| 2012/0172538 | A1 | 7/2012 | Touraud et al. |
| 2014/0295078 | A1 | 10/2014 | Paul et al. |
| 2014/0326657 | A1 | 11/2014 | Kang et al. |
| 2017/0136422 | A1* | 5/2017 | Ogawa .................. B01D 69/00 |
| 2017/0368510 | A1 | 12/2017 | Tanaka et al. |

FOREIGN PATENT DOCUMENTS

| | | |
|---|---|---|
| CN | 107106999 A | 8/2017 |
| EP | 0 085 111 A1 | 8/1983 |
| JP | 50-120481 A | 9/1975 |
| JP | 56-24007 A | 3/1981 |
| JP | 58-24303 A | 2/1983 |
| JP | 62-121603 A | 6/1987 |
| JP | 2-78428 A | 3/1990 |
| JP | 3-186328 A | 8/1991 |
| JP | 6-218254 A | 8/1994 |
| JP | 9-52031 A | 2/1997 |
| JP | 2000-202257 A | 7/2000 |
| JP | 2004-50144 A | 2/2004 |
| JP | 2014-144438 A | 8/2014 |
| WO | WO2011/000764 A1 | 1/2011 |
| WO | WO2016/066661 A1 | 5/2016 |

OTHER PUBLICATIONS

Chinese Office Action and Search Report for Chinese Application No. 202080075513.2, dated Jul. 15. 2023, with an English translation.
International Search Report, issued in PCT/JP2020/040809, dated Dec. 1, 2020.
Written Opinion of the International Searching Authority, issued in PCT/JP2020/040809, dated Dec. 1, 2020.
Chinese Office Action for Chinese Application No. 202080075513. 2, dated Dec. 28, 2023, with English translation.
Japanese Office Action for Japanese Application No. 2021-519183, dated Oct. 22, 2024, with English translation.
Korean Office Action for Korean Application No. 10-2022-7014164, dated Oct. 4, 2024, with English translation.

* cited by examiner

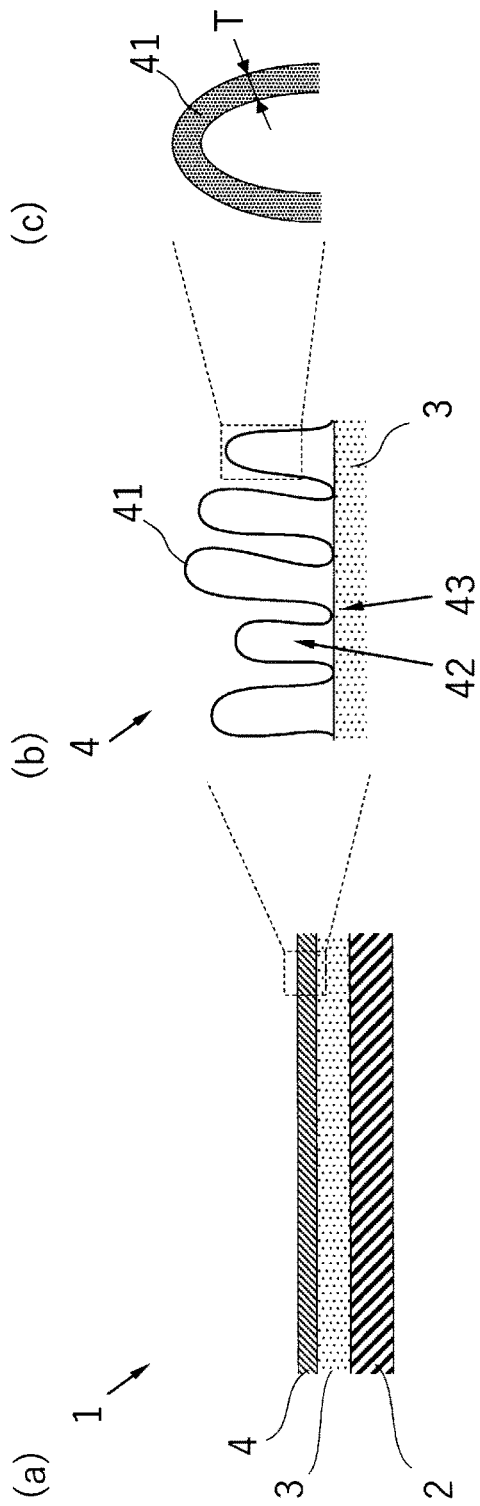

COMPOSITE SEMI-PERMEABLE MEMBRANE

TECHNICAL FIELD

The present invention relates to a composite semipermeable membrane useful for selective separation of liquid mixtures.

BACKGROUND ART

With respect to separation of a liquid mixture, there are various techniques for removing a substance (e.g., a salt) dissolved in a solvent (e.g., water), and membrane separation methods are coming to be increasingly utilized nowadays as processes for energy saving and resources saving. Examples of membranes for use in the membrane separation methods include microfiltration membranes, ultrafiltration membranes, nanofiltration membranes, and reverse osmosis membranes, and these membranes are used for, for example, obtaining drinking water from water containing salts or harmful substances, production of industrial ultrapure water, wastewater treatment, recovery of valuables, etc.

Most of the currently commercially available reverse osmosis membranes and nanofiltration membranes are composite semipermeable membranes formed by coating a support membrane with a separation functional layer having the ability to separate salts, etc. There are two kinds, i.e., one including a support membrane and, disposed thereover, a gel layer and an active layer formed by crosslinking a polymer and one including a support membrane and an active layer formed thereon by condensation-polymerizing monomers. In producing a composite semipermeable membrane, it is possible to independently select a separation functional layer, which performs a separation function, and a support membrane, which imparts strength to the separation functional layer. Composite semipermeable membranes hence can achieve separation performance and strength.

Various such composite semipermeable membranes have been disclosed. For example, Patent Document 1 discloses a composite semipermeable membrane obtained by coating a support membrane with a separation functional layer constituted of a crosslinked aromatic polyamide obtained by a polycondensation reaction of a polyfunctional amine with a polyfunctional acid halide.

CITATION LIST

Patent Literature

Patent Document 1: JP-A-S62-121603
Patent Document 2: JP-A-H2-78428

SUMMARY OF INVENTION

Technical Problems

However, the conventional composite semipermeable membrane including the separation functional layer constituted of a crosslinked aromatic polyamide, although achieving separation performance and permeation performance, has a problem in that this composite semipermeable membrane has limitations in its separation performance. There also is a problem in that the crosslinked aromatic polyamide constituting the separation functional layer is decomposed by contact with some kind of oxidants due to an operation error, etc., and this irreversibly impairs the separation performance.

An object of the present invention is to provide a composite semipermeable membrane which achieves excellent separation performance, in particular satisfactory salt-separating performance, and permeation performance and which further has excellent oxidation resistance.

Solution to the Problems

In order to solve the problems, the present invention provides a composite semipermeable membrane including:
a support membrane including a base and a porous support layer; and
a separation functional layer disposed on the porous support layer and including a crosslinked aromatic polyamide,
in which the separation functional layer contains sulfo groups in an amount of $7.0 \times 10^{-5}$ to $5.0 \times 10^{-2}$ g/m$^2$ and includes a structure represented by the following formula 1.

[Chem. 1]

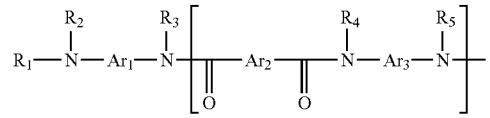

(Formula 1)

Provided that $R_1$ is a hydrogen atom or a hydrocarbon having a carbon number of 1-10 and optionally having a substituent, $R_2$ to $R_5$ are each a hydrogen atom or a hydrocarbon having a carbon number of 1-10, $Ar_1$ to $Ar_3$ are each an aromatic ring having a carbon number of 6-14 and optionally having a substituent, and at least one of $R_1$, $Ar_1$, $Ar_2$, and $Ar_3$ includes a sulfo group.

Advantageous Effect of the Invention

The present invention can provide a composite semipermeable membrane which is excellent in terms of salt-separating performance and permeation performance and also in oxidation resistance.

BRIEF DESCRIPTION OF DRAWING

The FIGURE is cross-sectional view schematically showing the structure of a composite semipermeable membrane: (a) is a cross-sectional view of the composite semipermeable membrane, (b) is an enlarged view of the separation functional layer, and (c) is an enlarged view of a pleat structure of the separation functional layer.

DESCRIPTION OF EMBODIMENTS

Embodiments of the present invention are explained in detail below but the present invention is not limited by the embodiments in any way.

1. Composite Semipermeable Membrane

An example of the structure of the composite semipermeable membrane is shown in the FIGURE. As shown in (a) of the FIGURE, a composite semipermeable membrane 1 includes a base 2, a porous support layer 3, and a separation functional layer.

(1-1) Support Membrane

The multilayer structure including the base 2 and the porous support layer 3 is called a support membrane. The support membrane is a membrane which is for imparting strength to the separation functional layer and which itself has substantially no solute-separating performance.

Examples of the base 2 include fabric including a polyester-based polymer, a polyamide-based polymer, a polyolefin-based polymer, or a mixture or copolymer thereof. Preferred of these is fabric of a polyester-based polymer having high mechanical and thermal stability. With respect to configurations of the fabric, it is preferred to use long-fiber nonwoven fabric, short-fiber nonwoven fabric, or woven or knitted fabric.

The porous support layer 3 has a large number of fine pores communicating with one another. The porous support layer is not particularly limited in the pore diameter or pore diameter distribution. For example, preferred is a porous support layer that has a symmetrical structure, in which the pores have an even diameter, or an unsymmetrical structure, in which the pore diameter gradually increases from one surface to the other surface, and that has a pore diameter of 0.1-100 nm in the surface on the smaller-pore-diameter side.

As a material for the porous support layer 3, use can be made of homopolymers or copolymers, such as a polysulfone (hereinafter "PSf"), a polyethersulfone, a polyamide, a polyester, a cellulosic polymer, a vinyl polymer, poly(phenylene sulfide), a poly(phenylene sulfide sulfone), poly(phenylene sulfone), and poly(phenylene oxide); any of these can be used alone or a blend of two or more thereof can be used. Examples of the cellulosic polymer include cellulose acetate and cellulose nitrate, and examples of the vinyl polymer include polyethylene, polypropylene, poly(vinyl chloride), and polyacrylonitrile. Preferred of these are homopolymers or copolymers such as PSf, polyamides, polyesters, cellulose acetate, cellulose nitrate, poly(vinyl chloride), polyacrylonitrile, poly(phenylene sulfide), and poly(phenylene sulfide sulfone)s. More preferred are cellulose acetate, PSf, poly(phenylene sulfide sulfone)s, or poly(phenylene sulfone). Especially preferred is PSf because this kind of polymers are highly stable chemically, mechanically, and thermally and are easy to mold.

The PSf has a weight-average molecular weight (hereinafter "$M_w$") of preferably 10,000-200,000, more preferably 15,000-100,000. In cases when the $M_w$ of the PSf is 10,000 or higher, a porous support layer having desirable mechanical strength and heat resistance can be obtained. Meanwhile, in cases when the $M_w$ of the PSf is 200,000 or less, a raw material solution for the porous support layer has a viscosity within an appropriate range and can have satisfactory formability.

The thicknesses of the base and porous support layer affect the strength of the composite semipermeable membrane and the packing density of the composite semipermeable membrane in an element. From the standpoint of obtaining satisfactory mechanical strength and packing density, the total thickness of the base and porous support layer is preferably 30-300 μm, more preferably 100-220 μm. The thickness of the porous support layer is preferably 20-100 μm. The thicknesses of the base and porous support layer can be each determined by examining a section thereof to measure the thickness thereof at 20 points at intervals of 20 μm along a direction (plane direction of the membrane) perpendicular to the thickness direction and calculating an average value of the measured thickness values.

(1-2) Separation Functional Layer

The separation functional layer 4 is a layer which has the function of separating solutes and includes a crosslinked aromatic polyamide. The separation functional layer 4 preferably includes the crosslinked aromatic polyamide as a main component.

The expression "including a crosslinked aromatic polyamide as a main component" means that the proportion of the crosslinked aromatic polyamide in the separation functional layer is 50 mass % or higher. The proportion of the crosslinked aromatic polyamide in the separation functional layer is preferably 80 mass % or higher, more preferably 90 mass % or higher.

The separation functional layer has a structure represented by formula 1 given above. In formula 1, at least one of $R_1$, $Ar_1$, $Ar_2$, and $Ar_3$ has a sulfo group. In formula 1, it is preferable that $R_1$ is a hydrocarbon having carbon number of 1 or 2 and having at least one sulfo group, and it is more preferable that $Ar_2$ is an aromatic ring having carbon number of 6-14 and having at least one sulfo group. That at least one of $R_1$, $Ar_1$, $Ar_2$, and $Ar_3$ in formula 1 has a sulfo group means that a sulfo-group-containing structure has been bonded to a terminal amino group or aromatic ring of the crosslinked aromatic polyamide.

The present inventors diligently made investigations and, as a result, have discovered that amino groups, especially terminal amino groups, of crosslinked aromatic polyamides are starting points for oxidative deterioration and that the oxidative deterioration can be inhibited by lowering the electron density of the amino groups, amide groups and aromatic rings. Since at least one of $R_1$, $Ar_1$, $Ar_2$, and $Ar_3$ in formula 1 has a sulfo group, which is an electron-attracting substituent, the amino groups, amide groups and the aromatic rings have a reduced electron density. Hence, a composite semipermeable membrane having reduced reactivity with oxidants including hypochlorous acid and having excellent oxidation resistance is obtained.

A sulfo group is a hydrophilic substituent and is present in an ionized state when in contact with neutral water. Since at least one of $R_1$, $Ar_1$, $Ar_2$, and $Ar_3$ in formula 1 has a sulfo group, which is hydrophilic and is negatively charged, a composite semipermeable membrane that combines excellent permeation performance due to the hydrophilicity, and excellent salt-separating performance due to Coulomb repulsion against the anion as a constituent component of a salt to be removed, is obtained.

The separation functional layer contains sulfo groups in an amount of $7.0 \times 10^{-5}$ to $5.0 \times 10^{-2}$ g/m$^2$. Since the content of sulfo groups is $7.0 \times 10^{-5}$ g/m$^2$ or higher, the separation functional layer can sufficiently exhibit the oxidation resistance due to the reduced electron density of the amino groups, amide groups and aromatic rings, the permeation performance due to hydrophilicity, and the salt-separating performance due to Coulomb repulsion. Meanwhile, since the content of sulfo groups is $5.0 \times 10^{-2}$ g/m$^2$ or less, it is possible to prevent the composite semipermeable membrane from being reduced in separation performance by an increase in pore diameter in the separation functional layer due to the Coulomb repulsion between the sulfo groups negatively charged when in contact with neutral water. The content of sulfo groups in the separation functional layer is preferably $1.0 \times 10^{-4}$ to $3.0 \times 10^{-2}$ g/m$^2$, more preferably $2.0 \times 10^{-4}$ to $1.0 \times 10^{-2}$ g/m$^2$, still more preferably $5.0 \times 10^{-4}$ to $7.0 \times 10^{-3}$ g/m$^2$.

A thickness-direction sulfo group distribution of the separation functional layer affects the separation performance and the permeation performance. The sulfo group distribution of the separation functional layer is determined from numerical values of the following C and D.

A: number of sulfo-group-derived sulfur atoms determined by X-ray photoelectron spectroscopy (XPS),
B: total number of nitrogen atoms in the separation functional layer determined by XPS,
C: A/B determined by examining a surface of the separation functional layer in the composite semipermeable membrane,
D: A/B determined by examining a solid obtained by molding a powder of the separation functional layer extracted from the composite semipermeable membrane.

C/D is preferably 3 or larger, more preferably 4 or larger. Here, C indicates the density of sulfo groups in the vicinity of the surface of the separation functional layer, and D indicates the density of sulfo groups in the whole separation functional layer. That C/D is 3 or larger means that sulfo groups are present at a high density in the vicinity of the surface of the separation functional layer. The composite semipermeable membrane including such a separation functional layer is excellent in terms of oxidation resistance, salt-separating performance, and permeation performance. There is no particular upper limit on C/D, and C/D is, for example, 10 or smaller.

The separation functional layer has a zeta potential at pH 3 of preferably −5 mV or lower, more preferably −10 mV or lower. Zeta potential is a measure of the net amount of fixed charges on the surface of a flat plate sample. The crosslinked aromatic polyamide included in the separation functional layer has amino groups, carboxy groups, and sulfo groups as terminal functional groups, and the degrees of dissociation of these groups depend on pH. At pH 3, the amino group is mainly in a positively charged state, the carboxy group is mainly neutral, and the sulfo group is mainly in a negatively charged state. That is, the zeta potential at pH 3 of the separation functional layer is thought to mainly depend on the amount of amino groups and sulfo groups. In cases when the zeta potential at pH 3 of the separation functional layer is −5 mV or lower, sulfo groups are present at a high density in the vicinity of the surface of the separation functional layer and, hence, a composite semipermeable membrane excellent in terms of oxidation resistance, salt-separating performance, and permeation performance is obtained.

The separation functional layer has a nitrogen-atom surface density, as determined by Rutherford backscattering spectrometry (hereinafter "RBS"), of preferably $4.0 \times 10^{20}$ to $1.2 \times 10^{21}$ atoms/m$^2$, more preferably $6.0 \times 10^{20}$ to $1.2 \times 10^{21}$ atoms/m$^2$, still more preferably $8.0 \times 10^{20}$ to $1.2 \times 10^{21}$ atoms/m$^2$. The nitrogen-atom surface density determined by RBS corresponds to the density of the crosslinked aromatic polyamide which is a main component of the separation functional layer. In cases when the nitrogen-atom surface density thereof determined by RBS is $4.0 \times 10^{20}$ atoms/m$^2$ or higher, the crosslinked aromatic polyamide is present at a high density and, hence, not only a composite semipermeable membrane having excellent separation performance due to a small pore diameter is obtained but also the composite semipermeable membrane can be prevented from being reduced in separation performance by an increase in pore diameter in the separation functional layer due to the Coulomb repulsion between the sulfo groups negatively charged when in contact with neutral water. Meanwhile, in cases when the nitrogen-atom surface density thereof determined by RBS is $1.2 \times 10^{21}$ atoms/m$^2$ or less, the density of the crosslinked aromatic polyamide is not too high and a composite semipermeable membrane having appropriate permeation performance is obtained.

The separation functional layer preferably contains a compound having a structure represented by the following formula 2.

[Chem. 2]

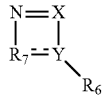

(Formula 2)

(In the formula, X and Y are each a nitrogen atom, an oxygen atom, or a hydrocarbon, $R_6$ is a hydrogen atom or a hydrocarbon having carbon number of 1-10, and $R_7$ is a hydrocarbon having carbon number of 2-4.)

The compound having this cyclic structure has an imine structure contained in the ring, and the nitrogen atom of this imine moiety is basic in water. Because of this, in the separation functional layer in the state of being in contact with water, portions represented by formula 2 form ion pairs with sulfo groups present on the crosslinked aromatic polyamide included in the separation functional layer. It is thought that hydrogen ions are thus released by electrolytic dissociation from the separation functional layer in the state of being in contact with water, making it possible to avoid electrostatic repulsion among the negatively charged sulfo groups and the resultant increase in pore diameter of the separation functional layer. As a result, a composite semipermeable membrane having satisfactory permeation performance and nevertheless having excellent separation performance is obtained.

The shape and thickness of the separation functional layer affect the separation performance and permeation performance. The separation functional layer preferably includes a pleated thin membrane 41 having a plurality of protuberances 42 and recesses 43 as shown in (b) of the FIGURE. In cases when the separation functional layer includes the pleated thin membrane, this separation functional layer can have a greatly improved specific surface area as compared with plane structures. As a result, it is possible to improve the permeation performance in proportion to the surface area of the separation functional layer while maintaining the separation performance. The inside of the protuberances 42 (space between the thin membrane 41 and the porous support layer 3) is voids.

The thin membrane has an average of thicknesses T of preferably 10-20 nm, more preferably 10-16 nm. In cases when the average of thicknesses T of the thin membrane is within that range, a composite semipermeable membrane achieving separation performance and permeation performance can be obtained.

From the standpoint of preventing a substance to be separated from penetrating into the composite semipermeable membrane, the separation functional layer has been disposed preferably on the front-surface side of the composite semipermeable membrane and more preferably on the primary-filtration side.

(1-3) NaCl Removal Ratio, Boron Removal Ratio, Membrane Permeation Flux

The composite semipermeable membrane has an NaCl removal ratio of preferably 99.75% or higher, more preferably 99.80% or higher, still more preferably 99.85% or higher. The composite semipermeable membrane has a boron removal ratio of preferably 80% or higher, more preferably 85% or higher, still more preferably 90% or higher. The composite semipermeable membrane has a membrane permeation flux of preferably 0.50 m$^3$/m$^2$/day or higher, more preferably 0.60 m$^3$/m$^2$/day or higher, still more preferably 0.70 m$^3$/m$^2$/day or higher. In cases when the composite semipermeable membrane has membrane performances within those ranges, this composite semipermeable membrane can be advantageously used as a separation membrane for seawater desalination applications.

The composite semipermeable membrane, after having been contacted with chlorine, has an NaCl removal ratio of preferably 99.60% or higher, more preferably 99.70% or higher, still more preferably 99.75% or higher. The composite semipermeable membrane, after having been contacted with chlorine, has a boron removal ratio of preferably 70% or higher, more preferably 75% or higher, still more preferably 80% or higher. In cases when the composite semipermeable membrane, after having been contacted with chlorine, has membrane performances within those ranges, this composite semipermeable membrane can be advantageously used as a composite semipermeable membrane reduced in the risk of being oxidatively deteriorated by a chlorine leakage. Conditions for contact with chlorine will be described in Examples.

2. Method for Producing the Composite Semipermeable Membrane

Methods for producing the composite semipermeable membrane of the present invention are not particularly limited so long as a composite semipermeable membrane satisfying the desired features described above is obtained. For example, the composite semipermeable membrane can be produced by the following method.

(2-1) Production of Support Membrane

A method for producing a support membrane is described below with an example in which PSf is used as a material for a porous support layer.

First, PSf is dissolved in a good solvent therefor to prepare a raw material solution for porous support layer. Preferred as the good solvent for PSf is, for example, N,N-dimethylformamide (hereinafter "DMF").

The concentration of PSf in the raw material solution for porous support layer is preferably 10-25 mass %, more preferably 12-20 mass %. In cases when the concentration of PSf in the raw material solution for porous support layer is within that range, a porous support layer achieving strength and permeation performance can be obtained. The preferred range of the concentration of a material in the raw material solution for porous support layer can be suitably regulated in accordance with the material and good solvent used, etc.

Next, the obtained raw material solution for porous support layer is applied to a surface of a base and the coated base is immersed in a coagulating bath including a nonsolvent for PSf.

The raw material solution for porous support layer, when being applied, has a temperature of preferably 10-60° C. In cases when the temperature of the raw material solution for porous support layer is within that range, the PSf does not precipitate and the raw material solution for porous support layer sufficiently infiltrates into interstices among fibers of the base before solidifying. As a result, the porous support layer tenaciously bonds to the base by the anchor effect and a support membrane having excellent strength can be obtained. The preferred range of the temperature of the raw material solution for porous support layer can be suitably regulated in accordance with the material and good solvent used, the concentration, etc.

The time period from the application of the raw material solution for porous support layer to immersion in the coagulating bath is preferably 0.1-5.0 seconds. In cases when the time period to immersion to the coagulating bath is 0.1 second or longer, the raw material solution for porous support layer sufficiently infiltrates into interstices among fibers of the base before solidifying. Meanwhile, in cases when the time period to immersion in the coagulating bath is 5.0 seconds or shorter, the coated base can be immersed in the coagulating bath before the raw material solution for porous support layer can have time to coagulate due to moisture in the air. The preferred range of the time period to immersion in the coagulating bath can be suitably regulated in accordance with the material and good solvent used, the concentration, etc.

The nonsolvent for PSf included in the coagulating bath is, for example, preferably water. By bringing the raw material solution for porous support layer which has been applied to the base surface into contact with the coagulating bath including a nonsolvent for PSf, the raw material solution for porous support layer is coagulated by phase separation induced by the nonsolvent. Thus, a support membrane including a porous support layer formed on the base surface can be obtained.

The coagulating bath may be constituted only of a nonsolvent for PSf. However, the coagulating bath may contain a good solvent for PSf so long as the raw material solution for porous support layer can be coagulated. In the case of continuously forming the support membrane, some of the good solvent for PSf comes from the raw material solution for porous support layer into the coagulating bath, resulting in a gradual increase in the concentration of the good solvent for PSf in the coagulating bath. It is hence preferred to suitably replace the coagulating bath so that the coagulating bath retains a composition within a certain range. The lower the concentration of the good solvent for PSf in the coagulating bath, the higher the rate of coagulation of the raw material solution for porous support layer. Consequently, lower good-solvent concentrations enable the porous support layer to be even in structure and have excellent strength. In addition, since lower good-solvent concentrations result in higher rates of coagulation of the raw material solution for porous support layer, it is possible to improve the efficiency of producing the support membrane, by heightening the rate of membrane formation. In view of this, the concentration of the good solvent for PSf in the coagulating bath is preferably 20% or less, more preferably 15% or less, still more preferably 10% or less.

The temperature of the coagulating bath is preferably −20 to 100° C., more preferably 10-50° C. In cases when the temperature of the coagulating bath is −20° C. or higher, coagulation proceeds at an appropriate rate and the raw material solution shows satisfactory film-forming properties. Meanwhile, in cases when the temperature of the coagulating bath is 100° C. or lower, the surface of the coagulating bath does not show vigorous vibration by thermal motion and the support membrane, after the formation of the porous support layer, retains surface smoothness. The preferred range of the temperature of the coagulating bath can be suitably regulated in accordance with the material and good solvent used, the concentration, etc.

Finally, the obtained support membrane is rinsed with hot water in order to remove the solvent remaining in the membrane. The temperature of the hot water is preferably 40-95° C., more preferably 60-95° C. In cases when the temperature of the hot water is 40° C. or higher, the solvent remaining in the membrane can be sufficiently removed.

Meanwhile, in cases when the temperature of the hot water is 95° C. or lower, the support membrane shrinks little and can retain satisfactory permeation performance. The preferred range of the temperature of the hot water can be suitably regulated in accordance with the material and good solvent used, the concentration, etc.

(2-2) Polymerization Step for Separation Functional Layer

A method for forming a separation functional layer including a crosslinked aromatic polyamide is described using, as an example, a method in which a polyfunctional aromatic amine and a polyfunctional aromatic acid chloride are polymerized and solidified on the support membrane obtained in "(2-1) Production of Support Membrane". A most preferred polymerization method is interfacial polymerization, from the standpoints of production efficiency and performance. Steps of interfacial polymerization are explained below.

The interfacial polymerization includes the following steps: (a) a step in which an aqueous solution containing a polyfunctional aromatic amine is brought into contact with the support membrane; (b) a step in which an organic-solvent solution containing a polyfunctional aromatic acid chloride is brought into contact with the support membrane which has been contacted with the aqueous solution containing a polyfunctional aromatic amine; (c) a step in which the excess organic-solvent solution is removed after the contact; and (d) a step in which the composite semipermeable membrane from which the excess organic-solvent solution has been removed is rinsed with hot water.

In step (a), examples of the polyfunctional aromatic amine include polyfunctional aromatic amines in which two amino groups have been bonded to an aromatic ring in ortho, meta. or para positions, such as o-phenylenediamine, m-phenylenediamine (hereinafter "m-PDA"), p-phenylenediamine, o-xylenediamine, m-xylenediamine, p-xylenediamine, o-diaminopyridine, m-diaminopyridine, and p-diaminopyridine, and further include 1,3,5-triaminobenzene, 1,2,4-triaminobenzene, 3,5-diaminobenzoic acid, 3-aminobenzylamine, 4-aminobenzylamine, and 2,4-diaminobenzenesulfonic acid. In cases when the separation performance, permeation performance, and heat resistance of the membrane are especially taken into account, it is preferred to use m-PDA, p-phenylenediamine, and 1,3,5-triaminobenzene. More preferred of these is m-PDA, from the standpoints of availability and handleability. By using 2,4-diaminobenzenesulfonic acid, the crosslinked aromatic polyamide can be made to have sulfo groups introduced onto aromatic rings thereof and a separation functional layer including a structure represented by formula 1 can be formed. One of those polyfunctional aromatic amines may be used alone, or two or more thereof may be used in combination.

The concentration of the polyfunctional aromatic amine in the aqueous solution of the polyfunctional aromatic amine is preferably 0.1-20 mass %, more preferably 0.5-15 mass %, still more preferably 1.0-10 mass %. In cases when the concentration of the polyfunctional aromatic amine is 0.1 mass % or higher, a separation functional layer having solute-separating performance can be formed. Meanwhile, in cases when the concentration of the polyfunctional aromatic amine is 20 mass % or less, a separation functional layer having satisfactory permeation performance can be formed. The aqueous solution of the polyfunctional aromatic amine may contain compounds such as, for example, a surfactant and an antioxidant according to need so long as these compounds do not inhibit the polymerization.

It is preferred to evenly and continuously bring the aqueous polyfunctional-aromatic-amine solution into contact with the support membrane. Specific examples of methods therefor include: a method in which the aqueous polyfunctional-aromatic-amine solution is applied to a surface of the support membrane; and a method in which the support membrane is immersed in the aqueous polyfunctional-aromatic-amine solution. The time period during which the support membrane is in contact with the aqueous polyfunctional-aromatic-amine solution is preferably 1 second to 10 minutes, more preferably 10 seconds to 3 minutes.

After the contact of the aqueous polyfunctional-aromatic-amine solution with the support membrane, the excess solution is preferably sufficiently removed so that no droplets remain on the support membrane. Sufficiently removing the excess solution makes it possible to avoid a trouble that portions where droplets remain become membrane defects after the formation of a composite semipermeable membrane to reduce the separation performance. Examples of methods for removing the excess solution include: a method in which the support membrane that has been contacted with the aqueous polyfunctional-aromatic-amine solution is vertically held to allow the excess aqueous solution to flow down naturally, as described in Patent Document 2; and a method in which a stream of a gas, e.g., nitrogen, is blown from an air nozzle against the support membrane to forcedly remove the excess solution. After the removal of the excess solution, the membrane surface may be dried to remove some of the water contained in the aqueous solution.

In step (b), examples of the polyfunctional aromatic acid chloride include trimesoyl chloride (hereinafter "TMC"), biphenyldicarbonyl dichloride, azobenzenedicarbonyl dichloride, terephthaloyl chloride, isophthaloyl chloride, naphthalenedicarbonyl chloride, and 2,5-furandicarbonyl chloride. One of these polyfunctional aromatic acid chlorides may be used alone, or two or more thereof may be used in combination.

The organic solvent is preferably a water-immiscible organic solvent in which the polyfunctional aromatic acid chloride dissolves and which does not attack the support membrane and is inert to both the polyfunctional aromatic amine and the polyfunctional aromatic acid chloride. Examples of the organic solvent include hydrocarbon compounds such as n-nonane, n-decane, n-undecane, n-dodecane, isooctane, isodecane, and isododecane and mixtures of these.

The concentration of the polyfunctional aromatic acid chloride in the organic-solvent solution is preferably 0.01-10 mass %, more preferably 0.02-4 mass %, still more preferably 0.03-2 mass %. In cases when the concentration of the polyfunctional aromatic acid chloride is 0.01 mass % or higher, the polymerization can be made to proceed at a sufficient reaction rate. Meanwhile, in cases when the concentration of the polyfunctional aromatic acid chloride is 10 mass % or less, the occurrence of side reactions during the polymerization can be inhibited. The organic-solvent solution may contain compounds such as, for example, a surfactant according to need so long as these compounds do not inhibit the polymerization.

For bringing the organic-solvent solution of the polyfunctional aromatic acid chloride into contact with the support membrane which has been contacted with the aqueous polyfunctional-aromatic-amine solution, use may be made of the same method as that used for coating the support membrane with the aqueous polyfunctional-aromatic-amine solution.

According to need, the support membrane which has been contacted with the organic-solvent solution of the polyfunctional aromatic acid chloride may be heat-treated. In the case of conducting the heat treatment, the heating temperature is preferably 50-180° C., more preferably 60-160° C., still more preferably 80-150° C. With respect to heating time, optimal heating times vary depending on the temperature of the membrane surface, which is the field of reaction. However, the heating time is preferably 10 seconds or longer, more preferably 20 seconds or longer.

In step (c), the organic-solvent solution remaining on the composite semipermeable membrane after the polymerization reaction is removed. Examples of methods for the removal include: a method in which the membrane is vertically held to allow the excess organic-solvent solution to flow down naturally and be removed thereby; a method in which the composite semipermeable membrane is dried by blowing air thereagainst with a blower to thereby remove the organic solvent; and a method in which the excess organic-solvent solution is removed with a water/air mixture fluid.

In step (d), the composite semipermeable membrane from which the organic solvent has been removed is rinsed with hot water. The temperature of the hot water is preferably 40-95° C., more preferably 60-95° C. In cases when the temperature of the hot water is 40° C. or higher, the unreacted reactants and oligomers remaining in the membrane can be sufficiently removed. Meanwhile, in cases when the temperature of the hot water is 95° C. or lower, the composite semipermeable membrane shrinks little and can retain satisfactory permeation performance. The preferred range of the temperature of the hot water can be suitably regulated in accordance with the polyfunctional aromatic amine and polyfunctional aromatic acid chloride used.

The composite semipermeable membrane may be further cleaned according to need. Examples of cleaning methods include a method in which radicals are brought into contact with the surface of the composite semipermeable membrane. Examples of the radicals include hydroxy radicals, hydroperoxy radicals, peroxy radicals, alkoxy radicals, thiyl radicals, and sulfite radicals. Of these, sulfite radicals are preferred from the standpoints of the intensity of the radicals and ease of regulating the concentration thereof. Meanwhile, chlorine radicals and persulfate radicals are not preferred because these radicals react with aromatic rings of the crosslinked aromatic polyamide to cause a chemical deterioration. By bringing radicals into contact with the surface of the composite semipermeable membrane, not only the unreacted reactants and oligomers remaining in the membrane can be further removed but also the thickness of the thin membrane can be regulated. Preferred ranges of the intensity and concentration of radicals, temperature, pH, etc. can be suitably regulated in accordance with the activity of the radicals to be used.

(2-3) Step of Modifying Separation Functional Layer

A method for forming a separation functional layer including a structure represented by formula 1 is described using, as an example, a method in which a sulfonating reagent is reacted with the separation functional layer including a crosslinked aromatic polyamide which was obtained in "(2-2) Polymerization Step for Separation Functional Layer".

Examples of the sulfonating reagent include chlorosulfonic acid, 1,3-propanesultone, 1,4-butanesultone, sodium 2-bromoethanesulfonate, methylsulfonyloxymethanesulfonic acid, sulfur trioxide/pyridine complex, N-sulfomaleimide, 1,3-disulfoimidazolium chloride, and dimethyl sulfomalonate. Any of these sulfonating reagents, in the state of either a solution thereof in a solvent which does not alter the support membrane or being the reagent alone without any solvent, is contacted and reacted with the separation functional layer. Thus, sulfo groups can be introduced into the crosslinked aromatic polyamide to form a separation functional layer including a structure represented by formula 1.

Examples of the solvent for the sulfonating reagent include water, methanol, ethanol, 1-propanol, 2-propanol, 1-butanol, 2-butanol, isobutyl alcohol, tert-butyl alcohol, formic acid, acetic acid, propionic acid, methyl acetate, ethyl acetate, and butyl acetate.

In the case of using a sulfonating-reagent solution, the concentration of the sulfonating reagent is preferably 0.05-20 mass %, more preferably 0.2-10 mass %, still more preferably 0.5-7 mass %. In cases when the concentration of the sulfonating reagent is 0.05 mass % or higher, sulfo groups can be sufficiently introduced into the crosslinked aromatic polyamide. Meanwhile, in cases when the concentration of the sulfonating reagent is 20 mass % or less, the composite semipermeable membrane can be inhibited from being altered by the solvent or by-produces of the reaction.

It is preferred to evenly and continuously bring the sulfonating reagent or the sulfonating-reagent solution into contact with the separation functional layer. Specific examples of methods therefor include: a method in which the sulfonating reagent or the sulfonating-reagent solution is applied to the surface of the separation functional layer; and a method in which the composite semipermeable membrane is immersed in the sulfonating reagent or the sulfonating-reagent solution. Furthermore, use may be made of a method in which the composite-semipermeable-membrane element that will be described later is first produced and the sulfonating reagent or sulfonating-reagent solution is then passed therethrough and reacted with the separation functional layer. The time period during which the separation functional layer is in contact with the sulfonating reagent or sulfonating-reagent solution is preferably 1 second to 24 hours, more preferably 10 seconds to 2 hours, still more preferably 20 seconds to 30 minutes.

Next, the composite semipermeable membrane which has undergone the modification reaction is rinsed with water. The temperature of the water is preferably 15-95° C., more preferably 40-95° C. In cases when the temperature of the water is 15° C. or higher, the unreacted reactants and by-products remaining in the membrane can be removed. Meanwhile, in cases when the temperature of the water is 95° C. or lower, the composite semipermeable membrane shrinks little and can retain satisfactory permeation performance. The preferred range of the temperature of the water can be suitably regulated in accordance with the sulfonating reagent used.

The composite semipermeable membrane obtained by the production method described above has an NaCl removal ratio of preferably 99.60% or higher, more preferably 99.70% or higher. The obtained composite semipermeable membrane has a boron removal ratio of preferably 80% or higher, more preferably 85% or higher. Furthermore, the composite semipermeable membrane, just after production, has a membrane permeation flux of preferably 0.50 m$^3$/m$^2$/day or higher, more preferably 0.70 m$^3$/m$^2$/day or higher. In cases when the composite semipermeable membrane, just after production, has membrane performances within those ranges, this composite semipermeable membrane can be advantageously used as a separation membrane for seawater desalination applications.

3. Utilization of the Composite Semipermeable Membrane

The composite semipermeable membrane is suitable for use in a spiral composite-semipermeable-membrane element, produced by winding the composite semipermeable membrane around a cylindrical water collection pipe having a large number of holes formed therein, together with a feed-water channel material, such as a plastic net, and a permeate channel material, such as tricot, and optionally with a film for enhancing the pressure resistance. Such elements can be connected serially or in parallel and housed in a pressure vessel to fabricate a composite-semipermeable-membrane module.

The composite semipermeable membrane or the element or module thereof can be combined with a pump for supplying feed water thereto, a device for pretreating the feed water, etc. to configure a fluid separator. By using this separator, feed water can be separated into a permeate, e.g., drinking water, and a concentrate, which has not passed through the membrane, thereby obtaining the desired water.

Examples of the feed water to be treated with the composite semipermeable membrane according to the present invention include liquid mixtures having a TDS (total dissolved solids) of 500 mg/L to 100 g/L, such as seawater, brackish water, and wastewater. In general, the term "TDS" means the content of total dissolved solids, which is represented by "weight÷volume" or "weight ratio". According to a definition, a TDS value can be calculated from the weight of residues obtained by filtering the feed water with a 0.45-μm filter and vaporizing the filtrate solution at a temperature of 39.5-40.5° C. However, a simpler method is to convert a practical salinity (S).

Higher operation pressures for the fluid separator result in an improvement in solute removal ratio but also result in an increase in the amount of energy required for the operation. Because of this and in view of the durability of the composite semipermeable membrane, the operation pressure at the time when the water to be treated is caused to pass through the composite semipermeable membrane is preferably 0.5-10 MPa. The temperature of the feed water is preferably 5-45° C. since the solute removal ratio decreases as the temperature rises and the membrane permeation flux decreases as the temperature declines. In cases when the pH of the feed water is high, there is a possibility that use of feed water having a high solute concentration, e.g., seawater, might result in generation of a scale of magnesium, etc. In addition, high-pH operations may deteriorate the membrane. It is hence preferred to operate the fluid separator at a pH in a neutral range.

EXAMPLES

The present invention will be described below with reference to specific Examples, but the present invention is not limited by the following Examples in any way.

Property values of the composite semipermeable membrane of the present invention were determined by the following methods.

(1) Sulfo Group Content, C/D
(i) In Vicinity of Surface of Separation Functional Layer The composite semipermeable membrane was cut into a 3 cm×3 cm square, rinsed with 90° C. distilled water for 10 minutes, and dried. The surface of the separation functional layer of the dried composite semipermeable membrane was examined with an XPS (Quantera SXM, manufactured by PHI) to calculate the number of sulfo-group-derived sulfur atoms (A) and the total number of nitrogen atoms (B). The value of A/B was taken as C. Specific examination conditions were as shown below.

(ii) In Whole Separation Functional Layer

The composite semipermeable membrane was cut to obtain portions thereof in an amount of 1 m² in total, which were rinsed in 90° C. distilled water for 10 minutes and dried. The base was peeled from the dried composite semipermeable membrane, and the residual two-layer structure composed of the porous support layer and the separation functional layer was introduced into dichloromethane to thereby dissolve away the polymer constituting the porous support layer. The sediment including the separation functional layer as a main component was repeatedly washed with dichloromethane until the polymer constituting the porous support layer became undetected by thin-layer chromatography. The washed sediment was freeze-dried to thereby obtain a powder of the separation functional layer. The obtained powder was molded into pellets. The molded sample was examined with the XPS to calculate the number of sulfo-group-derived sulfur atoms (A) and the total number of nitrogen atoms (B). The value of A/B was taken as D. Furthermore, the content of sulfo groups per unit area in the separation functional layer was calculated from A. Specific examination conditions were as follows.

Excitation X-Ray: Monochromatic Al Kα1,2 Ray (1486.6 eV)

X-Ray Diameter: 0.2 mm

An S2p peak obtained with an XPS is assigned to inner-shell electrons of the sulfur atom, while an N1s peak is assigned to inner-shell electrons of the nitrogen atom. A component attributable to S—C appears at around 169 eV, while a component attributable to N—C appears at around 400 eV. A was determined from the area of the peak attributable to S—C, while B was determined from the area of the peak attributable to N—C.

(2) Average of Thickness T of Thin Membrane

The composite semipermeable membrane was cut into a 3 cm×3 cm square and rinsed with 25° C. distilled water for 24 hours. The rinsed composite semipermeable membrane was embedded in an epoxy resin and then dyed with osmium tetroxide to obtain a sample to be examined. A thin-membrane section of the obtained sample was examined with a scanning transmission electron microscope (HD2700, manufactured by Hitachi, Ltd.). An image acquired at a magnification of 1,000,000 diameters was used to measure a minimum distance from a point lying on the outer surface of the thin membrane to the inner surface thereof, and this distance was taken as the thickness T of the thin membrane. With respect to arbitrarily selected ten protuberances, five portions of each protuberance were thus examined. An average of these measured values was taken as the average thickness of the thin membrane.

(3) Nitrogen-Atom Surface Density

The composite semipermeable membrane was cut into a 10 cm×10 cm square and rinsed with 25° C. distilled water for 24 hours. The surface of the separation functional layer of the rinsed composite semipermeable membrane was examined with an RBS (Pelletron 3SDH, manufactured by National Electrostatics Corporation) to calculate a nitrogen-atom surface density. Specific examination conditions were as follows.

Examination mode: examination with the RBS alone
Incident ions: $^4He^{2+}$
Incidence energy: 2,300 keV
Incidence angle: 0°
Scattering angle: 160°

Sample current: 4 nA

Beam diameter: 2 mm (diameter)

Irradiation amount: 0.8 µC×126 points=100.8 µC (4) Zeta Potential

The composite semipermeable membrane was rinsed with distilled water. The rinsed composite semipermeable membrane was set in a cell for flat samples, and the surface of the separation functional layer was examined with an electrophoresis light-scattering photometer (ELS-8000, manufactured by Otsuka Electronics Co., Ltd.) to determine the zeta potential at pH 3 of the separation functional layer. Five examination portions were arbitrarily selected and an average for the portions was taken as the zeta potential. Specific examination conditions were as follows.

Monitor particles: polystyrene latex (coated with hydroxypropyl cellulose)

Examination liquid: aqueous NaCl solution (10 mM)

pH: 3

Temperature: 25° C.

Light source: He—Ne laser (5) Weight-Average Molecular Weight

The PSf was examined for weight-average molecular weight (calculated for polystyrene) using a gel permeation chromatography (HLC-8022, manufactured by Tosoh Corp.). Specific examination conditions were as follows.

Columns: two TSK gel SuperHM-H columns (manufactured by Tosoh Corp.; inner diameter, 6.0 mm; length, 15 cm)

Eluent: LiBr/N-methylpyrrolidone solution (10 mM)

Sample concentration: 0.1 mass %

Flow rate: 0.5 mL/min

Temperature: 40° C.

(6) NaCl Removal Ratio

Water for evaluation which had been regulated so as to have an NaCl concentration of 35,000 ppm, a boron concentration of 5 ppm, a temperature of 25° C., and a pH of 7 was supplied to the composite semipermeable membrane at an operating pressure of 5.5 MPa to conduct a membrane filtration test. The water for evaluation and the permeate were examined for electrical conductivity with a multi water quality meter (MM-60R, manufactured by DKK-Toa Corp.) to obtain the NaCl concentration (practical salinity) of each of the water for evaluation and the permeate. From the thus-obtained NaCl concentrations, an NaCl removal ratio (%) was calculated using the following equation 3.

NaCl removal ratio (%)=100×{1−(NaCl concentration in permeate)/(NaCl concentration in water for evaluation)} (Equation 3)

(7) Boron Removal Ratio

In the membrane filtration test of "(6) NaCl Removal Ratio", the water for evaluation and the permeate were examined for boron concentration with an ICP emission analyzer (Agilent 5110, manufactured by Agilent Technologies, Inc.). A boron removal ratio (%) was calculated using the following equation 4.

Boron removal ratio (%)=100×{1−(boron concentration in permeate)/(boron concentration in water for evaluation)} (Equation 4)

(8) Membrane Permeation Flux

In the membrane filtration test of "(6) NaCl Removal Ratio", the amount of the permeate ($m^3$) was measured. The permeate amount was converted to a value per unit membrane area ($m^2$) per unit time period (day) to obtain a membrane permeation flux ($m^3/m^2/day$).

(9) Contact with Chlorine

The composite semipermeable membrane was immersed for 24 hours in 25 mg/L aqueous sodium hypochlorite solution regulated so as to have a temperature of 25° C. and a pH of 7.0 and subsequently immersed in 1,000 mg/L aqueous sodium hydrogen sulfite solution for 10 minutes, and was then rinsed with distilled water.

Materials for composite semipermeable membranes used in the Examples and Comparative Examples are summarized below.

PSf (Udel P-3500, manufactured by Solvay Specialty Polymers; $M_w$, 80,000)

DMF (manufactured by FUJIFILM Wako Pure Chemical Corp.)

Long-fiber polyester nonwoven fabric (thickness, 90 pin; density, 0.42 $g/cm^3$)

m-PDA (manufactured by FUJIFILM Wako Pure Chemical Corp.)

TMC (manufactured by FUJIFILM Wako Pure Chemical Corp.)

Decane (manufactured by FUJIFILM Wako Pure Chemical Corp.)

Sodium hypochlorite (manufactured by FUJIFILM Wako Pure Chemical Corp.)

Sodium hydrogen sulfite (manufactured by FUJIFILM Wako Pure Chemical Corp.)

Isopropyl alcohol (manufactured by FUJIFILM Wako Pure Chemical Corp.)

Sulfanilic acid (manufactured by FUJIFILM Wako Pure Chemical Corp.)

1,3-Propanesultone (manufactured by FUJIFILM Wako Pure Chemical Corp.)

Chlorosulfonic acid (manufactured by FUJIFILM Wako Pure Chemical Corp.)

Butyl acetate (manufactured by FUJIFILM Wako Pure Chemical Corp.)

Comparative Example 1

Fifteen mass % PSf and 85 mass % DMF were dissolved at 100° C. to prepare a raw material solution for porous support layer. This raw material solution for porous support layer was applied to a surface of long-fiber polyester nonwoven fabric at 25° C., and at 3 seconds thereafter, the coated nonwoven fabric was immersed for 30 seconds in a coagulating bath constituted of 25° C. distilled water, thereby coagulating the raw material solution. This coated nonwoven fabric was rinsed with 80° C. hot water for 2 minutes, thereby obtaining a support membrane including a porous support layer formed on the base surface. The porous support layer in the obtained support membrane had a thickness of 50 µm.

Subsequently, the obtained support membrane was immersed in 3 mass % aqueous m-PDA solution for 2 minutes and then slowly pulled up in the vertical direction. Nitrogen was blown against the support membrane from an air nozzle to thereby remove the excess aqueous solution from the surface of the support membrane. In an environment regulated so as to have a temperature of 40° C., a 40° C. decane solution containing 0.18 mass % TMC was applied thereto so that the surface was completely wetted. This coated support membrane was allowed to stand still for 1 minute and then held vertically to remove the excess solution. Thus, a layer including a crosslinked aromatic polyamide was formed on the support membrane to obtain a composite semipermeable membrane. Finally, the composite semipermeable membrane was rinsed with 80° C. hot water for 2 minutes. The obtained composite semipermeable membrane was evaluated, and the results thereof are shown in Table 2.

Comparative Example 2

The support membrane obtained in Comparative Example 1 was immersed in 3 mass % aqueous m-PDA solution for 2 minutes and then slowly pulled up in the vertical direction. Nitrogen was blown against the support membrane from an air nozzle to thereby remove the excess aqueous solution from the surface of the support membrane. In an environment regulated so as to have a temperature of 45° C., a 45° C. decane solution containing 0.2 mass % TMC was applied thereto so that the surface was completely wetted. This coated support membrane was allowed to stand still for 10 seconds, subsequently heated in a 120° C. oven for 10 minutes, and then held vertically to remove the excess solution. Thus, a layer including a crosslinked aromatic polyamide was formed on the support membrane to obtain a composite semipermeable membrane. Thereafter, the composite semipermeable membrane was rinsed with 80° C. hot water for 2 minutes. Furthermore, oxygen was bubbled into an aqueous sodium hydrogen sulfite solution to thereby prepare a 25° C. aqueous solution containing $1.0 \times 10^{-3}$ mol/L sulfite radicals and having a pH of 3, in which the composite semipermeable membrane was immersed for 1 hour. Finally, the composite semipermeable membrane was immersed in 25° C. 10 mass % aqueous isopropyl alcohol solution for 1 hour and then immersed in 25° C. distilled water for 1 hour. The obtained composite semipermeable membrane was evaluated, and the results thereof are shown in Table 2.

Comparative Example 3

The composite semipermeable membrane obtained in Comparative Example 1 was immersed at 25° C. for 24 hours in an aqueous solution containing 1 mass % poly(acrylic acid)/vinylsulfonic acid copolymer and 0.1 mass % 4-(4,6-dimethoxy-1,3,5-triazin-2-yl)-4-methylmorpholinium chloride and having a pH of 7. This composite semipermeable membrane was rinsed with 45° C. distilled water for 10 minutes to obtain a composite semipermeable membrane including a modified separation functional layer. The obtained composite semipermeable membrane was evaluated, and the results thereof are shown in Table 2.

Comparative Example 4

The composite semipermeable membrane obtained in Comparative Example 1 was immersed at 25° C. for 24 hours in an aqueous solution containing 1 mass % poly(acrylic acid)/4-vinylphenylsulfonic acid copolymer and 0.1 mass % 4-(4,6-dimethoxy-1,3,5-triazin-2-yl)-4-methylmorpholinium chloride and having a pH of 7. This composite semipermeable membrane was rinsed with 45° C. distilled water for 10 minutes to obtain a composite semipermeable membrane including a modified separation functional layer. The obtained composite semipermeable membrane was evaluated, and the results thereof are shown in Table 2.

Comparative Example 5

The composite semipermeable membrane obtained in Comparative Example 2 was immersed at 25° C. for 24 hours in an aqueous solution containing 1 mass % poly(acrylic acid)/3-(methacrylamido)propylsulfonic acid copolymer and 0.1 mass % 4-(4,6-dimethoxy-1,3,5-triazin-2-yl)-4-methylmorpholinium chloride and having a pH of 7. This composite semipermeable membrane was rinsed with 45° C. distilled water for 10 minutes to obtain a composite semipermeable membrane including a modified separation functional layer. The obtained composite semipermeable membrane was evaluated, and the results thereof are shown in Table 2.

Comparative Example 6

The composite semipermeable membrane obtained in Comparative Example 2 was immersed at 35° C. for 45 seconds in 2,750 mg/L aqueous sodium nitrite solution having a pH adjusted to 3 with sulfuric acid. Thereafter, the composite semipermeable membrane was immersed for 2 minutes in a mixture solution containing 0.01 mass % sulfanilic acid and 0.1 mass % sodium sulfite. This composite semipermeable membrane was rinsed with 45° C. distilled water for 10 minutes to obtain a composite semipermeable membrane including a modified separation functional layer. The obtained composite semipermeable membrane was evaluated, and the results thereof are shown in Table 2.

Example 1

The composite semipermeable membrane obtained in Comparative Example 1 was immersed in 1 mass % aqueous 1,3-propanesultone solution at 25° C. for 24 hours. This composite semipermeable membrane was rinsed with 45° C. distilled water for 10 minutes to obtain a composite semipermeable membrane including a modified separation functional layer. The obtained composite semipermeable membrane was evaluated, and the results thereof are shown in Table 2.

Example 2

The surface of the separation functional layer of the composite semipermeable membrane obtained in Comparative Example 1 was coated with a butyl acetate solution containing 1 mass % chlorosulfonic acid and kept in contact therewith at 25° C. for 2 minutes. This composite semipermeable membrane was rinsed with 45° C. distilled water for 10 minutes to obtain a composite semipermeable membrane including a modified separation functional layer. The obtained composite semipermeable membrane was evaluated, and the results thereof are shown in Table 2.

Example 3

The composite semipermeable membrane obtained in Comparative Example 2 was immersed in 1 mass % aqueous 1,3-propanesultone solution at 25° C. for 24 hours. This composite semipermeable membrane was rinsed with 45° C. distilled water for 10 minutes to obtain a composite semipermeable membrane including a modified separation functional layer. The obtained composite semipermeable membrane was evaluated, and the results thereof are shown in Table 2.

Example 4

The surface of the separation functional layer of the composite semipermeable membrane obtained in Comparative Example 2 was coated with a butyl acetate solution containing 1 mass % chlorosulfonic acid and kept in contact therewith at 25° C. for 10 minutes. This composite semipermeable membrane was rinsed with 45° C. distilled water for 10 minutes to obtain a composite semipermeable membrane including a modified separation functional layer. The obtained composite semipermeable membrane was evaluated, and the results thereof are shown in Table 2.

Example 5

The surface of the separation functional layer of the composite semipermeable membrane obtained in Comparative Example 2 was coated with 1 mass % aqueous 1,3-disulfoimidazolium chloride solution and kept in contact therewith at 25° C. for 1 hour. This composite semipermeable membrane was rinsed with 45° C. distilled water for 10 minutes to obtain a composite semipermeable membrane including a modified separation functional layer. The obtained composite semipermeable membrane was evaluated, and the results thereof are shown in Table 2.

Example 6

The composite semipermeable membrane obtained in Comparative Example 2 was used to fabricate a composite-semipermeable-membrane element by the method described above, and 1 mass % aqueous 1,3-disulfoimidazolium chloride solution was passed through the element at 25° C. for 2 hours so that the whole composite semipermeable membrane within the element was wetted. Thereafter, a sufficient amount of distilled water was passed through the composite-semipermeable-membrane element to clean the element. The composite semipermeable membrane including a modified separation functional layer was taken out of the cleaned composite-semipermeable-membrane element. The obtained composite semipermeable membrane was evaluated, and the results thereof are shown in Table 2.

TABLE 1

| | Production method | | | |
|---|---|---|---|---|
| | Sulfonating reagent | Concentration mass % | Solvent | Contact method | Contact time |
| Comparative Example 1 | — | — | — | — | — |
| Comparative Example 2 | — | — | — | — | — |
| Comparative Example 3 | poly(acrylic acid)/vinylsulfonic acid copolymer | 1 | water | immersion | 24 hr |
| Comparative Example 4 | poly(acrylic acid)/4-vinylphenylsulfonic acid copolymer | 1 | water | immersion | 24 hr |
| Comparative Example 5 | poly(acrylic acid)/3-(methacrylamido)propylsulfonic acid copolymer | 1 | water | immersion | 24 hr |
| Comparative Example 6 | sulfanilic acid | 0.01 | water | immersion | 2 min |
| Example 1 | 1,3-propanesultone | 1 | water | immersion | 24 hr |
| Example 2 | chlorosulfonic acid | 1 | butyl acetate | coating | 2 min |
| Example 3 | 1,3-propanesultone | 1 | water | immersion | 24 hr |
| Example 4 | chlorosulfonic acid | 1 | butyl acetate | coating | 10 min |
| Example 5 | 1,3-disulfoimidazolium chloride | 1 | water | coating | 1 hr |
| Example 6 | 1,3-disulfoimidazolium chloride | 1 | water | passing through element | 2 hr |

TABLE 2

| | Membrane structure | | | | | Membrane performance | | | After contact with chlorine | |
|---|---|---|---|---|---|---|---|---|---|---|
| | Average | | | | | Just after production | | | | |
| | Sulfo group content ×$10^{-5}$ g/m$^2$ | thickness of thin membrane nm | Nitrogen-atom surface density ×$10^{20}$ atoms/m$^2$ | C/D — | Zeta potential mV | NaCl removal ratio % | Boron removal ratio % | Membrane permeation flux m$^3$/m$^2$/day | NaCl removal ratio % | Boron removal ratio % |
| Comparative Example 1 | 0.0 | 12 | 6.2 | — | 1.0 | 99.62 | 89 | 0.81 | 99.37 | 72 |
| Comparative Example 2 | 0.0 | 17 | 10.3 | — | 1.8 | 99.72 | 93 | 0.65 | 99.55 | 78 |
| Comparative Example 3 | 4.4 | 14 | 6.2 | 3.5 | 2.1 | 99.65 | 89 | 0.74 | 99.44 | 72 |
| Comparative Example 4 | 5.3 | 14 | 6.2 | 4.1 | -2.9 | 99.64 | 88 | 0.75 | 99.46 | 73 |
| Comparative Example 5 | 4.7 | 20 | 10.8 | 4.1 | -1.3 | 99.74 | 91 | 0.61 | 99.58 | 78 |
| Comparative Example 6 | 4.1 | 17 | 10.7 | 1.4 | -1.8 | 99.73 | 92 | 0.58 | 99.55 | 77 |
| Example 1 | 9.0 | 12 | 6.2 | 2.2 | -6.5 | 99.79 | 90 | 1.04 | 99.68 | 80 |
| Example 2 | 38.2 | 12 | 6.2 | 5.6 | -10.5 | 99.85 | 88 | 0.88 | 99.76 | 82 |
| Example 3 | 11.6 | 17 | 10.3 | 1.8 | -7.7 | 99.83 | 92 | 0.76 | 99.72 | 82 |

TABLE 2-continued

| | Membrane structure | | | | Membrane performance | | | After contact with chlorine | |
| --- | --- | --- | --- | --- | --- | --- | --- | --- | --- |
| | Average | | | | Just after production | | | | |
| | Sulfo group content ×$10^{-5}$ g/m$^2$ | thickness of thin membrane nm | Nitrogen-atom surface density ×$10^{20}$ atoms/m$^2$ | C/D | Zeta potential mV | NaCl removal ratio % | Boron removal ratio % | Membrane permeation flux m$^3$/m$^2$/day | NaCl removal ratio % | Boron removal ratio % |
| Example 4 | 64.7 | 17 | 10.3 | 4.2 | −12.4 | 99.91 | 90 | 0.80 | 99.85 | 85 |
| Example 5 | 61.9 | 17 | 10.3 | 5.0 | 12.2 | 99.91 | 92 | 0.71 | 99.86 | 86 |
| Example 6 | 80.3 | 17 | 10.3 | 2.3 | −13.0 | 99.88 | 90 | 0.79 | 99.80 | 84 |

In Comparative Examples 1 and 2, sulfo groups were not introduced, and the spaces for C/D are hence left blank.

The invention claimed is:

1. A composite semipermeable membrane comprising:
    a support membrane comprising a base and a porous support layer; and
    a separation functional layer disposed on the porous support layer and comprising a crosslinked aromatic polyamide,
    wherein the separation functional layer contains sulfo groups in an amount of $7.0 \times 10^{-5}$ to $5.0 \times 10^{-2}$ g/m$^2$ and includes a structure represented by the following formula 1:

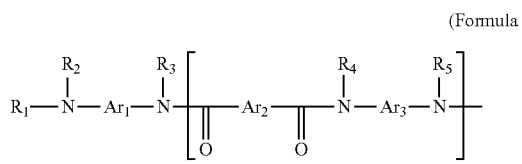

(Formula 1)

provided that
    $R_1$ is a hydrogen atom or a hydrocarbon having a carbon number of 1 to 10 and optionally having a substituent,
    $R_2$ to $R_5$ are each a hydrogen atom or a hydrocarbon having a carbon number of 1 to 10,
    $Ar_1$ to $Ar_3$ are each an aromatic ring having a carbon number of 6 to 14 and optionally having a substituent, and
    at least one of $R_1$, $Ar_1$, $Ar_2$, and $Ar_3$ includes a sulfo group; and
    wherein the separation functional layer has a zeta potential at pH 3 of −5 mV or lower.

2. The composite semipermeable membrane according to claim 1, wherein the separation functional layer comprises a pleated thin membrane,
    the thin membrane has an average thickness of 10 nm-20 nm, and
    the separation functional layer has a nitrogen-atom surface density, as determined by Rutherford backscattering spectrometry (RBS), of $4.0 \times 10^{20}$ to $1.2 \times 10^{21}$ atoms/m$^2$.

3. The composite semipermeable membrane according to claim 1, wherein a compound having a structure represented by the following formula 2 is present in the separation functional layer:

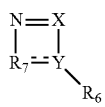

(Formula 2)

provided that X and Y are each a nitrogen atom, an oxygen atom, or a hydrocarbon,
    $R_6$ is a hydrogen atom or a hydrocarbon having a carbon number of 1 to 10, and $R_7$ is a hydrocarbon having a carbon number of 2 to 4.

4. The composite semipermeable membrane according to claim 1, wherein $R_1$ in formula 1 is a hydrocarbon having a carbon number of 1 or 2 and having at least one sulfo group.

5. The composite semipermeable membrane according to claim 1, wherein $Ar_2$ in formula 1 is an aromatic ring having a carbon number of 6 to 14 and having at least one sulfo group.

6. The composite semipermeable membrane according to claim 1, wherein the separation functional layer has a C/D ratio value of 3 to 10,
    provided that,
    A is the number of sulfo-group-derived sulfur atoms as determined by X-ray photoelectron spectroscopy (XPS),
    B is the total number of nitrogen atoms as determined by XPS,
    C is the A/B ratio as determined by examining a surface of the separation functional layer in the composite semipermeable membrane, and
    D is the A/B ratio as determined by examining a solid obtained by molding a powder of the separation functional layer extracted from the composite semipermeable membrane.

* * * * *